(12) United States Patent
Kim et al.

(10) Patent No.: US 12,416,897 B2
(45) Date of Patent: Sep. 16, 2025

(54) HOLOGRAPHIC VOLUMETRIC DISPLAYS

(71) Applicant: NVIDIA CORPORATION, Santa Clara, CA (US)

(72) Inventors: Jonghyun Kim, San Francisco, CA (US); Ward Lopes, San Jose, CA (US); David Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 139 days.

(21) Appl. No.: 18/313,214

(22) Filed: May 5, 2023

(65) Prior Publication Data
US 2024/0103437 A1 Mar. 28, 2024

Related U.S. Application Data

(60) Provisional application No. 63/376,734, filed on Sep. 22, 2022.

(51) Int. Cl.
*G03H 1/00* (2006.01)
*G03H 1/12* (2006.01)
*G03H 1/02* (2006.01)

(52) U.S. Cl.
CPC ............ *G03H 1/0005* (2013.01); *G03H 1/12* (2013.01); *G03H 2001/0088* (2013.01); *G03H 2001/0212* (2013.01); *G03H 2210/20* (2013.01); *G03H 2210/30* (2013.01); *G03H 2223/50* (2013.01)

(58) Field of Classification Search
CPC ............ G03H 1/0005; G03H 1/12; G03H 2001/0088; G03H 2001/0212; G03H 2210/20; G03H 2210/30; G03H 2223/50; G03H 2001/2244; G03H 2001/0816; G03H 2001/2213; G03H 1/2205; G03H 1/2294; G06N 3/08
See application file for complete search history.

(56) References Cited

U.S. PATENT DOCUMENTS

| | | | |
|---|---|---|---|
| 2023/0273352 A1* | 8/2023 | Cano | G03H 1/265 359/1 |
| 2023/0384614 A1* | 11/2023 | Sharma | G02B 30/56 |
| 2024/0184103 A1* | 6/2024 | Fukuhara | G02B 27/0025 |

OTHER PUBLICATIONS

Nayar et al., "3D Display Using Passive Optical Scatterers", Published by the IEEE Computer Society, vol. 40, No. 7, 2007, pp. 54-63.
Cutting et al., "Perceiving Layout and Knowing Distances: The Integration, Relative Potency, and Contextual Use of Different Information about Depth", Perception of space and motion, 1995, pp. 69-117.

(Continued)

*Primary Examiner* — Hesham K Abouzahra
(74) *Attorney, Agent, or Firm* — Artegis Law Group, LLP

(57) ABSTRACT

One embodiment of a display system includes one or more light sources, one or more spatial light modulators, and a plurality of scatterers. One embodiment of a method for displaying content includes computing at least one of a phase or an amplitude modulation associated with two-dimensional (2D) or three-dimensional (3D) content, and causing one or more spatial light modulators to modulate light based on the at least one of a phase or an amplitude modulation to generate modulated light, where the modulated light is scattered by a plurality of scatterers.

20 Claims, 11 Drawing Sheets

(56) References Cited

OTHER PUBLICATIONS

Smalley et al., "Volumetric Displays Turning 3-D Inside-Out", Optics & Photonics News, Jun. 2018, pp. 28-33.
Choi et al., "Time-multiplexed Neural Holography: A Flexible Framework for Holographic Near-eye Displays with Fast Heavily-quantized Spatial Light Modulators", arXiv:2205.02367, May 5, 2022, 29 pages.
Kim et al., "Holographic Glasses for Virtual Reality", ACM SIGGRAPH 2022 Conference Proceedings, https://doi.org/10.1145/3528233.3530739, Aug. 7-11, 2022, 9 pages.
Computer-Generated Holography, Retrieved from https://web.archive.org/web/20220209180936/http://www.nicolaspegard.com/research_holography.php, 2022, 2 pages.

* cited by examiner

HOLOGRAPHIC VOLUMETRIC DISPLAYS

CROSS-REFERENCE TO RELATED APPLICATIONS

This application claims priority benefit of the U.S. Provisional Patent Application titled, "HOLOGRAPHIC VOLUMETRIC DISPLAY," filed on Sep. 22, 2022, and having Ser. No. 63/376,734. The subject matter of this related application is hereby incorporated herein by reference.

BACKGROUND

Technical Field

Embodiments of the present disclosure relate generally to display systems and three-dimensional displays and, more specifically, to holographic volumetric displays and techniques for implementing the same.

Description of the Related Art

Virtual three-dimensional (3D) content has become prevalent in many forms of media, such as films and video games. Head-mounted displays are oftentimes used to display 3D content to users. However, head-mounted displays are typically worn by individual users, who cannot share their viewing experiences readily with other users. Therefore, various other approaches have been developed that attempt to display 3D content to multiple users simultaneously to allow those users to share a common viewing experience.

One conventional approach for displaying 3D content to multiple users is to employ a light field display. The light field display typically includes a micro lens array attached to a high-resolution two-dimensional (2D) display. One drawback of conventional light field displays is that these types of displays typically provide only horizontal parallax. Another drawback is that these types of displays typically display 3D content within only a limited field of view. As a result of the foregoing drawbacks, users are oftentimes required to sit upright and directly in front of conventional light field displays to perceive the 3D effects being displayed.

Another conventional approach for displaying 3D content to multiple users is to employ a rotating display. For example, a liquid crystal display (LCD) screen can be rotated, while pixels of the LCD screen are updated with appropriate timing, to create 3D effects. One drawback of conventional rotating displays is that these types of displays can be noisy, particularly when rotating during operation. Another drawback is that these types of displays can be dangerous to users due to the considerable speed at which the displays rotate during operation. Yet another drawback is that, as a general matter, these types of displays provide relatively poor image quality.

As the foregoing illustrates, what is needed in the art are more effective techniques for displaying 3D content to multiple users.

SUMMARY

One embodiment of the present disclosure sets forth a display system. The display system includes one or more light sources, one or more spatial light modulators, and a plurality of scatterers.

Another embodiment of the present disclosure sets forth a computer-implemented method for displaying content. The method includes computing at least one of a phase or an amplitude modulation associated with two-dimensional (2D) or three-dimensional (3D) content. The method further includes causing one or more spatial light modulators to modulate light based on the at least one of a phase or an amplitude modulation to generate modulated light, wherein the modulated light is scattered by a plurality of scatterers.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques and designs relative to the prior art is that the disclosed techniques and designs enable holographic volumetric displays that display 2D or 3D content, including 2D or 3D content that includes occlusions, to multiple users with vertical as well as horizontal parallax effects. Further, the disclosed techniques and designs enable holographic volumetric displays to display 2D or 3D content that has relatively high image quality and can be viewed from any direction. Accordingly, with the disclosed techniques and designs, users are not required to sit upright and directly in front of the disclosed holographic volumetric displays to perceive 3D effects. In addition, the disclosed holographic volumetric displays do not include rotating components that are noisy or potentially dangerous to users. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for displaying two-dimensional (2D) or three-dimensional (3D) content using holographic volumetric displays. In some embodiments, a holographic volumetric display system includes one or more light sources that emit light, one or more spatial light modulators (SLMs) that modulate a phase and/or an amplitude of the light emitted by the one or more light sources, and multiple scatterers that scatter the light after the phase and/or amplitude modulation has been applied. The scatterers can be disposed within a container of any suitable shape and size, such as a cylindrical container. In some embodiments, a machine learning model is trained, via a camera-in-the-loop training technique, to approximate a light propagation function that defines how light from each pixel of the SLM(s) is propagated to a number of target planes within the container. It should be noted that camera-in-the-loop is the same as hardware-in-the-loop when the hardware is a camera. Phase and/or amplitude optimization can be performed using the trained machine learning model to determine the phase and/or amplitude modulation that is required to display particular 2D or 3D content. In some other embodiments, the phase and/or an amplitude modulation required to display particular 2D or 3D content is directly calculated via a camera-in-the-loop optimization technique.

The techniques for displaying 2D or 3D content have many real-world applications. For example, those techniques could be used to display 2D or 3D content on a tabletop. As another example, those techniques could be used to display 2D or 3D content on a wall, or anywhere else that a conventional television can be placed to display 2D content.

The above examples are not in any way intended to be limiting. As persons skilled in the art will appreciate, as a general matter, the techniques and designs for displaying 2D or 3D content herein can be implemented in any suitable manner.

System Overview

Figure 1:
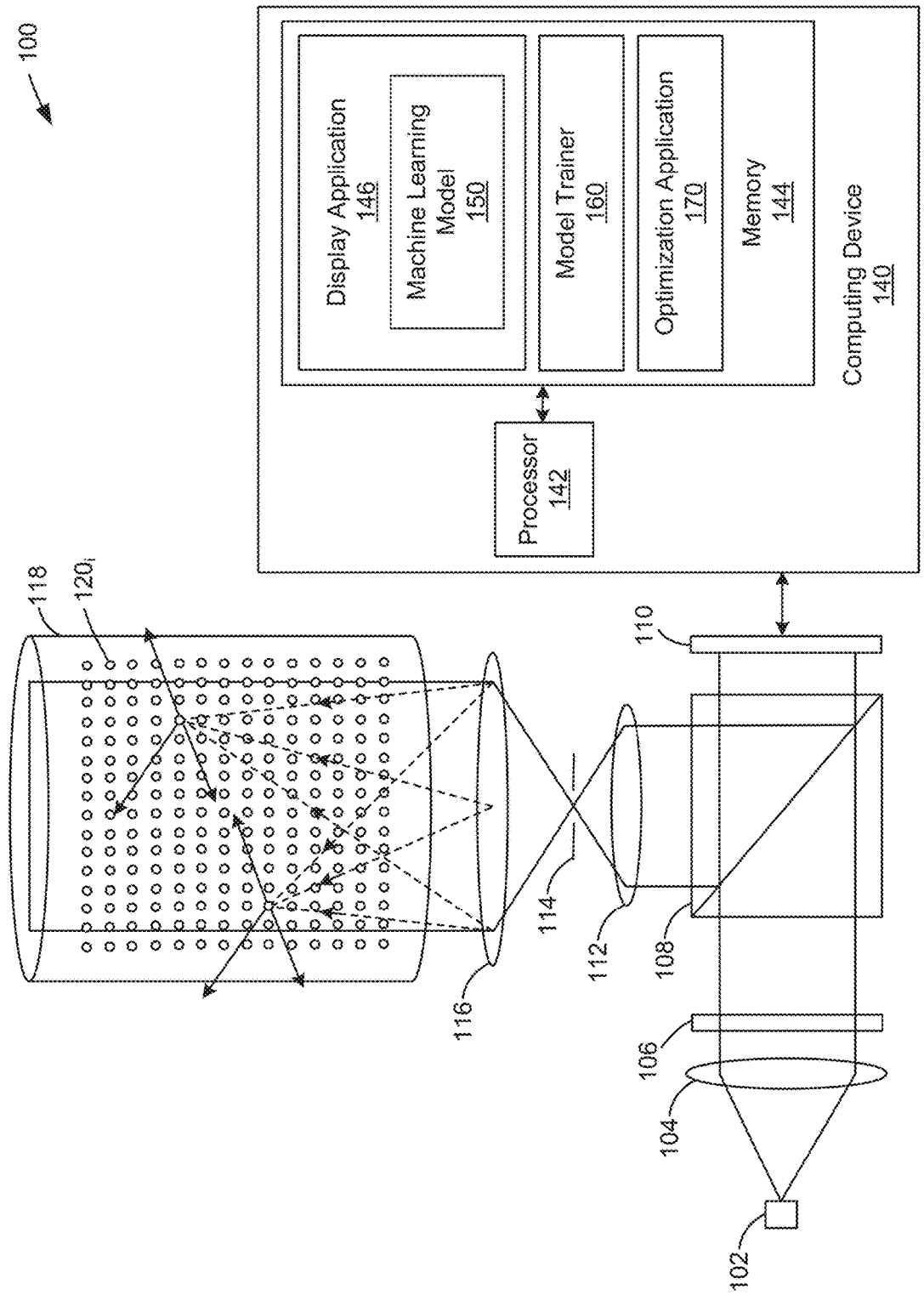
FIG. 1 illustrates a holographic volumetric display system, according to various embodiments.

FIG. 1 illustrates a holographic volumetric display system 100, according to various embodiments. As shown, the holographic volumetric display system 100 includes a light source 102, a lens 104, a polarizer 106, a beam splitter 108, a spatial light modulator (SLM) 110, two additional lenses 112 and 116, a spatial filter 114, a transparent cylindrical container 118 in which optical scatterers 1201 (referred to herein collectively as "scatterers 120" and individually as "a scatterer 120") are disposed, and a computing device 140. Although a cylindrical container 118 is shown for illustrative purposes, in some embodiments, scatterers can be disposed within a container having any suitable shape (e.g., a cube or a rectangular prism) and size that does not obscure the scatterers within the container.

In some embodiments, the light source 102 is a coherent light source, such as a laser. Although a single light source 102 is shown for illustrative purposes, in some embodiments, multiple light sources, such as light sources that emit different colors of light, can be used to display two-dimensional (2D) or three-dimensional (3D) content in color. In operation, the light source 102 (or multiple light sources) emits light (e.g., laser light) that is collimated by the lens 104. The collimated light passes through, and is polarized by, the polarizer 106. The polarized light then passes through a beam splitter 108, after which the polarized light is incident on the SLM 110. The SLM 110 applies spatially-varying phase and/or an amplitude modulation to the incident light, which is also reflected by the SLM 110. In some embodiments, the SLM 110 includes multiple pixels that can be used to modulate the phase of incident light. In some embodiments, the SLM 110 includes multiple pixels that can be used to modulate the amplitude of incident light. In some embodiments, the SLM 110 includes multiple pixels that can be used to perform complex modulation of the phase and/or amplitude of incident light.

The modulated and reflected light, produced by the SLM 110, is further reflected by the beam splitter 108. The light reflected by the beam splitter is filtered and magnified by the lens 112, the spatial filter 114, and the lens 116, which form a 4-f system. The filtered and magnified light then passes through the cylindrical container 118 and is scattered by any number of the scatterers 120 to form a 2D or 3D image. In some embodiments, each scatterer 120 has different optical properties, such as being reflective or having a different index of refraction, than the surrounding medium through which light travels. Each scatterer 120 acts as a volumetric pixel, which are also sometimes referred to as "voxels," that collects light waves from the SLM 110 plane and can be turned on or off depending on whether the light waves light up the scatterer 120. In some embodiments, the number of volumetric pixel scatters 120 can be greater than the number of pixels in the SLM 110. For example, in some embodiments, time-multiplexing can be used to turn on and/or off a larger number of volumetric pixel scatters 120 than the number of pixels in the SLM 110. In some embodiments, overlapping volumetric pixels can be turned on via diffraction, which is another beneficial characteristic of the holographic volumetric display system 100. It should be understood that the volumetric pixel scatterers 120 provide an empty 3D screen. Any number of voxels of the 3D screen can be lit up, and the particular voxels that are lit up at any given time is programmable. For example, if a target volumetric 3D scene is a dot at the center, then one voxel at the center of the 3D screen can be lit up for the scene, with all SLM pixels focusing lighting on that the voxel.

In some embodiments, the scatterers 120 are passive scatters that cannot be moved or reoriented within the container 118. In such cases, the container 118 is a passive medium that includes the passive scatterers. In some embodiments, the scatterers 120 can have any suitable shape and size, and the scatterers 120 can also be constructed from any technically feasible material or materials. For example, in some embodiments, the scatterers 120 can be constructed from pearls, glass fiber, silicon powder, micro prisms or lenses, etc. As another example, in some embodiments, the scatterers 120 can be spherical, hem i-spherical, or cubic in shape and white or another color that tends to reflect light. As another example, in some embodiments, the scatterers 120 can be relatively small and sparsely distributed within the container 118, but with a sufficient concentration to produce a desired display resolution. In such cases, the size of the scatterers 120 can be small enough such that most light passes through the container that includes the scatterers, but large enough to scatter converged light. For example, in some embodiments, the scatterers 120 can be similar in size to the lateral resolution (diffraction limit) of the holographic volumetric display system. In some embodiments, the scatters 120 can scatter light in any suitable direction(s). For example, in some embodiments, the scatterers 120 can scatter light in all directions uniformly (i.e., isotropically), or in particular directions that are controllable to display 2D or 3D content with occlusions, as discussed in greater detail below in conjunction with FIGS. 7A-D and 8. In some embodiments, the scatterers 120 are disposed randomly within the container 118. In some embodiments, the scatterers 120 are disposed in a patterned manner within the container 118. For example, in some embodiments, the scatterers 120 can be disposed in regular patterns on multiple planes within the container 118, as discussed below in conjunction with FIGS. 2A-2B.

For example, assume the SLM 110 has a pixel pitch $p_s$, a width $w_s$, and a height $h_s$. In such a case, modulated light that is reflected by the SLM 110 can be further reflected by the beam splitter 108, filtered and magnified by a factor of M by the 4-f system that includes the lenses 112 and 116 and the spatial filter 114, and form a 2D or 3D image inside the cylindrical container 118 with a $d\lambda M/w_s$ lateral resolution, where d is the distance between the image plane and the SLM 118 before magnification, and $\lambda$ is a wavelength of the light.

Figure 2A:
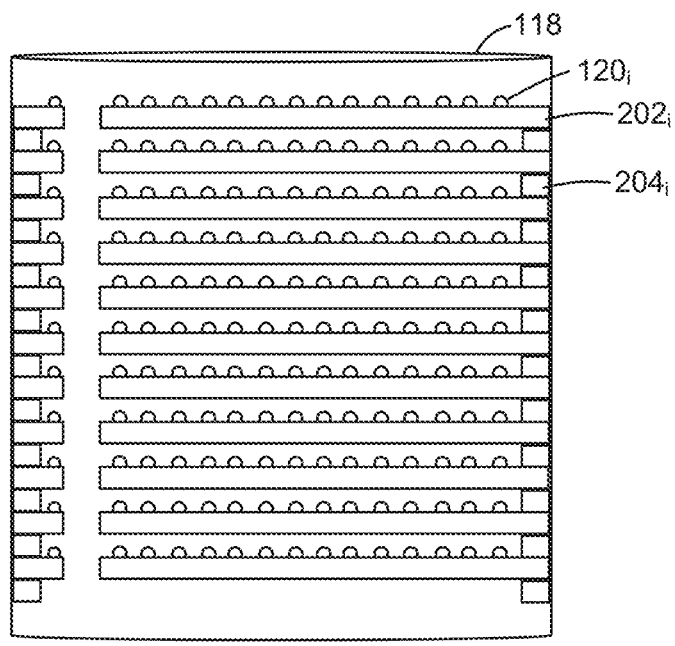
FIGS. 2A-2B illustrate in greater detail the cylindrical container and scatterers of FIG. 1, according to various embodiments.
Figure 2B:
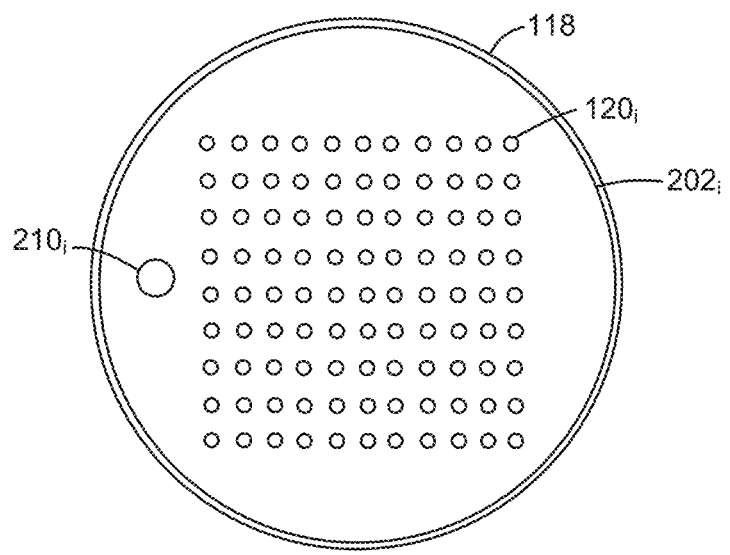

FIGS. 2A-2B illustrate in greater detail the cylindrical container 118 that includes scatterers 120 of FIG. 1, according to various embodiments. FIG. 2A shows a cross-section view of the container 118. As shown, the container 118 includes multiple transparent cylindrical plates $202_i$ (referred to herein collectively as "cylindrical plates 202" and individually as "a cylindrical plate 202"), on which the scatterers 120 are disposed. For example, the scatterers 120 could be printed on the cylindrical plates 202. Transparent ring spacers 2041 (referred to herein collectively as "ring spacers 204" and individually as "a ring spacer 204") are disposed between pairs of the cylindrical plates 202. In addition, the container 118 holds a liquid having an index of refraction that substantially matches an index of refraction of the plurality of transparent plates 202 and of the ring spacers 204, i.e., an index-matching liquid, so that optical events do not occur at surfaces of the transparent plates 202, the ring spacers 204, or the container 118. For example, in some embodiments, the container 118 can be filled with an index-matching oil.

FIG. 2B shows a top-down view of the container 118. As shown, scatterers 120 are disposed in a regular pattern on each cylindrical plate 202. In addition, each cylindrical plate 202 includes a hole $210_i$ (referred to herein collectively as "holes 210" and individually as "a hole 210") through which the index-matching liquid can flow. In some embodiments, the holes 210 in the cylindrical plates 202 can be aligned with each other to provide a passage for the index-matching liquid. In some embodiments, plate identification (ID) numbers can be printed on the plates 202 and used for depth calibration purposes.

Although the cylindrical container 118 that includes cylindrical plates 202 on which scatterers 120 are disposed is shown as a reference example, in some embodiments, a container in which scatterers are disposed can (1) have any technically feasible shape and size, and (2) be manufactured in any technically feasible manner. For example, in some embodiments, a container in which scatterers are disposed can be manufactured using a laser-induced-damage printing technique. In such cases, a laser can be used to form cracks in a transparent material to engrave within the material. As another example, in some embodiments, a container in which scatterers are disposed can be manufactured using printing and an ultraviolet (UV) bonding technique. In such cases, high-resolution dot images can be printed on films and bonded with an optical adhesive. As yet another example, in some embodiments, a container in which scatterers are disposed can be manufactured using an injection molding technique with a scattering solution. In such cases, a melted plastic material in which passive scatterers are floating can be injected into a mold via high pressure injection. As a further example, in some embodiments, a container in which scatterers are disposed can be manufactured using a vacuum casting technique with a scattering solution. Vacuum casting is similar to injection molding, except vacuum casting is performed at room temperature and can create larger volumes.

Returning to FIG. 1, a display application 146 causes 2D or 3D content to be displayed via the holographic volumetric display system 100 by controlling the phase and/or amplitude modulation that is applied by the SLM 110. More specifically, the display application 146 aligns the 3D pixel locations of a 2D or 3D image with particular scatterers 120 by controlling the phase and/or amplitude modulation applied by the SLM 110. As a result, the particular scatterers 120 will be lit up and scatter light to generate a light distribution within the volume of the container 118, thereby forming the 2D or 3D image within the container 118. Notably, a generated 3D image can be viewed from any direction and provides all 3D depth cues, such as binocular disparities, motion parallax, accommodation and vergence, etc. Because the scatterers 120 act as volumetric pixels, lighting up a scatterer 120 essentially turns that volumetric pixel "on." By contrast, a scatterer 120 that is not lit up acts as a volumetric pixel that is "off." In some embodiments, the scatterers 120 can also be lit up with different colored light to display 2D or 3D content in color. To display a different image, the phase and/or amplitude modulation applied by the SLM 110 can be changed to cause other scatterers 120 to light up and scatter light. In some embodiments, the display application 146 uses a trained machine learning model 150 to determine the phase and/or amplitude modulation that is required to display particular 2D or 3D content, i.e., the target volumetric image. In such cases, the machine learning model 150 is trained, by a model trainer 160 and via a camera-in-the-loop training technique, to approximate a light propagation function that defines how light from each pixel of the SLM 110 is propagated to a number of target planes within the container 118. That is, camera-in-the-loop training allows the machine learning model 150 to learn a forward propagation function that accounts for the alignment and aberration information of a given system, such as how scatterers are distributed within a container. Techniques for training and applying the machine learning model 150 are described in greater detail below in conjunction with FIGS. 5 and 9-10. In some other embodiments, an optimization application 170 calculates the phase and/or an amplitude modulation required to display particular 2D or 3D content via a camera-in-the-loop optimization technique, after which the display application 146 can apply the phase and/or amplitude modulation to display the particular 2D or 3D content. A camera-in-the-loop optimization technique is described in greater detail below in conjunction with FIGS. 6 and 11.

As shown, the display application 146, the model trainer 160, and the optimization application 170 execute on a processor 142 of the computing device 140 and are stored in a system memory 144 of the computing device 140. Although shown as executing on the same computing device 140 as the display application 146, in some embodiments, the model trainer 160 and/or the optimization application 170 can be stored in, and execute on, other computing devices than the display application 146. The processor 142 receives user input from input devices, such as a keyboard or a mouse. In operation, the processor 142 is the master processor of the computing device 140, controlling and coordinating operations of other system components. In particular, the processor 142 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 144 of the computing device 140 stores content, such as software applications and data, for use by the processor 142 and the GPU. The system memory 144 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 144. The storage can include any number and type of external memories that are accessible to the processor 142 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the computing device 140 shown herein is illustrative and that variations and modifications are possible. For example, the number of processors 142, the number of GPUs, the number of system memories 144, and the number of applications included in the system memory 144 can be modified as desired. Further, the connection topology between the various units in FIG. 1 can be modified as desired. In some embodiments, any combination of the processor 142, the system memory 144, and a GPU can be replaced with any type of virtual computing system, distributed computing system, or cloud computing environment, such as a public, private, or a hybrid cloud.

Figure 3:
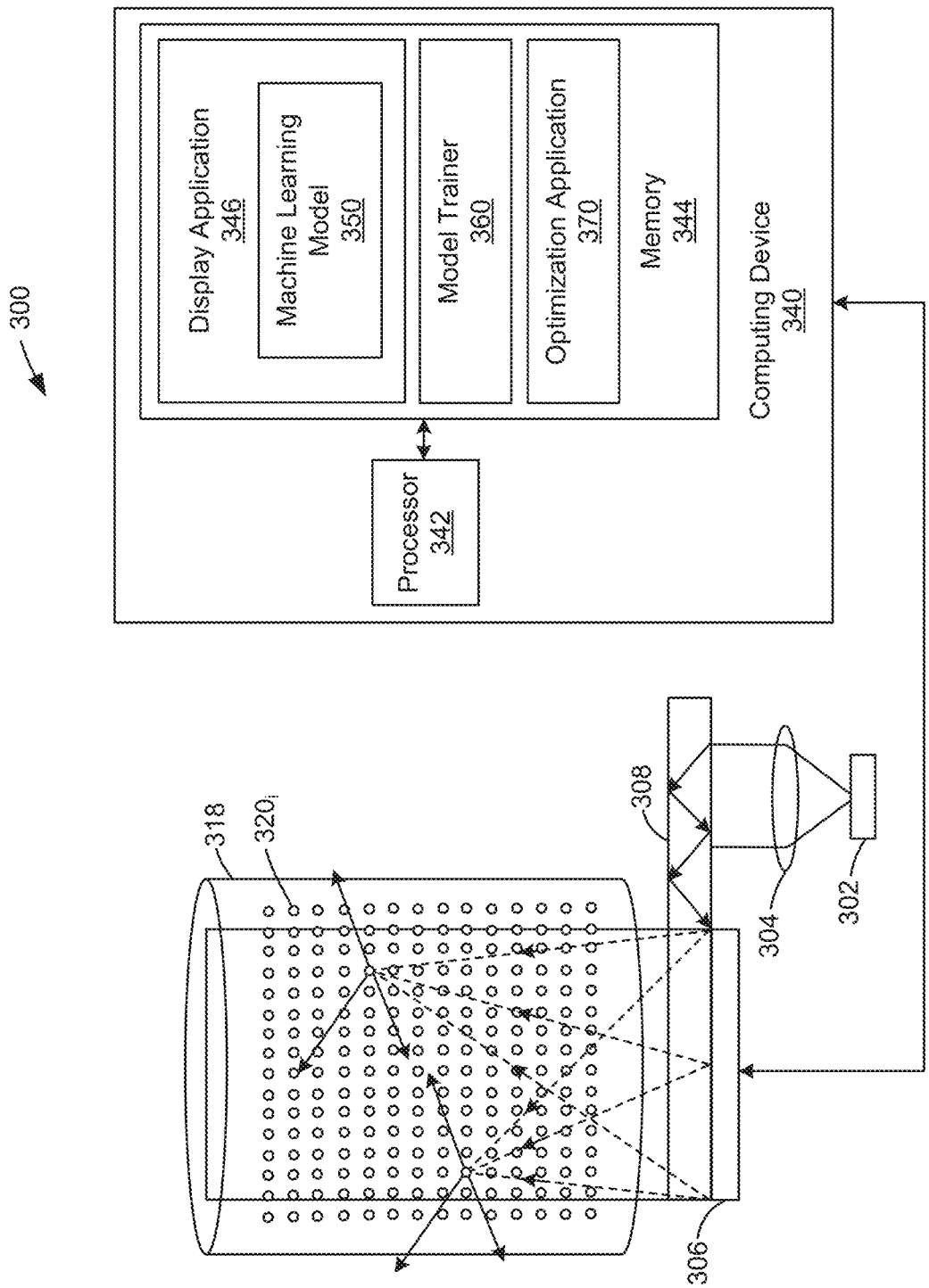
FIG. 3 illustrates a holographic volumetric display system, according to various other embodiments.

FIG. 3 illustrates a holographic volumetric display system 300, according to various other embodiments. As shown, the holographic volumetric display system 300 includes a light source 302 (or multiple light sources), a lens 304, a waveguide 308, an SLM 306, a cylindrical container 318 in which optical scatterers 320; (referred to herein collectively as "scatterers 320" and individually as "a scatterer 320") are disposed, and a computing device 340. Although one SLM 306 is shown for illustrative purposes, in some embodiments, the holographic volumetric display system 300 can include a stack of multiple SLMs. For example, in some embodiments, multiple SLMs can be tiled based on a size of the target volume, namely the cylindrical container 318, without increasing the overall thickness of the holographic volumetric display system 300. In such cases, the tiled SLMs do not have to be bezel-less because, unlike light field displays, a small empty region at the SLM plane would not create a blind zone.

In some embodiments, the light source 302, the lens 304, the SLM 306, the container 318, and the computing device 340 are similar to the light source 102, the lens 104, the SLM 106, the container 118, and the computing device 140, respectively, described above in conjunction with FIGS. 1-2. However, the holographic volumetric display system 300 can be more compact relative to the holographic volumetric display system 100, described above in conjunction with FIG. 1, because the beam expanding optics 112 and 116 and the beam splitter 108 are replaced with a waveguide 308 backlit illumination, which enables a relatively compact form factor and scalable design. In operation, the light source 302 (or multiple light sources) emits light (e.g., laser light) that is collimated by the lens 304. The waveguide 308 guides the collimated light to the SLM 306, which applies phase and/or an amplitude modulation to, and reflects, the collimated light. The modulated and reflected light passes through the cylindrical container 118 and is scattered by any number of scatterers 320 therein to form a 2D or 3D image within the container 118. In addition, the display application 346 causes 2D or 3D content to be displayed via the holographic volumetric display system 300 by controlling the phase and/or amplitude modulation applied by the SLM 306.

Although exemplar holographic volumetric display systems 100 and 300 are described above in conjunction with FIGS. 1-3 for illustrative purposes, in some embodiments, a holographic volumetric display system can include one or more light sources that emit light, one or more SLMs that modulate a phase and/or an amplitude of the light, multiple scatterers that scatter the light after the phase and/or amplitude modulation has been applied, and any suitable optical elements between the light source and the SLM(s), and between the SLM(s) and the scatterers.

In addition, in some embodiments, a holographic volumetric display system (e.g., holographic volumetric display system 100 or 300) can be integrated into furniture. For example, in some embodiments, a container (e.g., cylindrical container 118 or 318) that includes scatterers can extend out from a table (e.g., a coffee table), either permanently or in response to user input via a control device, while other components of the holographic volumetric display system are hidden within the table. In some other embodiments, the holographic volumetric display system can be mounted on a wall, or placed anywhere else that a conventional television can be located.

Figure 4:
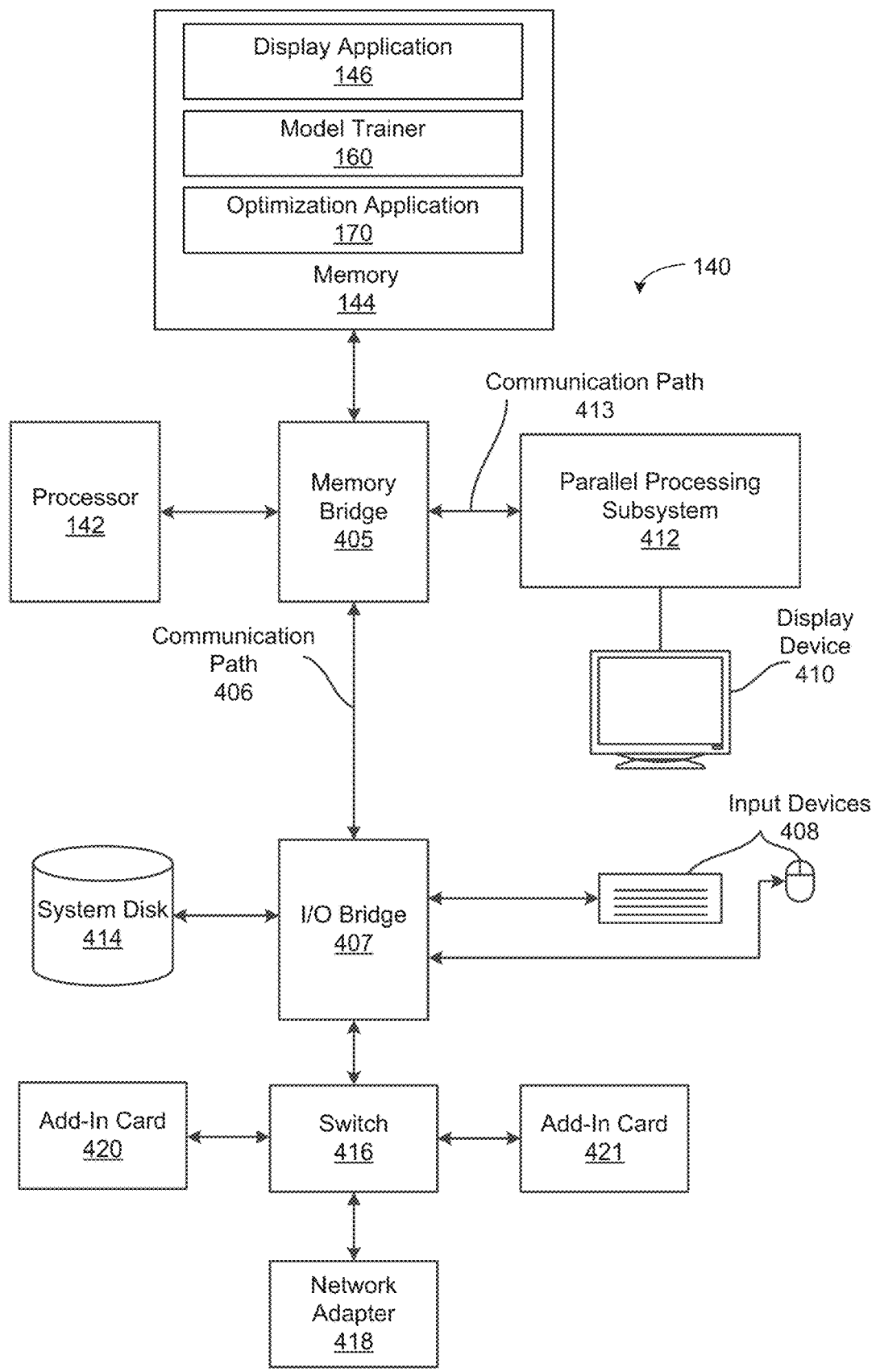
FIG. 4 illustrates in greater detail the computing device of FIG. 1, according to various embodiments.

FIG. 4 illustrates in greater detail the computing device 140 of FIG. 1, according to various embodiments. As persons skilled in the art will appreciate, the computing device 140 can be any type of technically feasible computer system, including, without limitation a dedicated computer system of the holographic volumetric display system 100, a server machine, a server platform, a desktop machine, laptop machine, a hand-held/mobile device, or a wearable device. In some embodiments, the computing device 140 is a server machine operating in a data center or a cloud computing environment that provides scalable computing resources as a service over a network. In some embodiments, the computing device 340, described above in conjunction with FIG. 3, can include similar components as the computing device 140.

In various embodiments, the computing device 140 includes, without limitation, the processor 142 and the system memory 144 coupled to a parallel processing subsystem 412 via a memory bridge 405 and a communication path 413. Memory bridge 405 is further coupled to an I/O (input/output) bridge 407 via a communication path 406, and I/O bridge 407 is, in turn, coupled to a switch 416.

In one embodiment, I/O bridge 407 is configured to receive user input information from optional input devices 408, such as a remote control device, a keyboard, a mouse, etc. and forward the input information to processor 142 for processing via communication path 406 and memory bridge 405. In some embodiments, computing device 140 may be a server machine in a cloud computing environment. In such embodiments, computing device 140 may not have input devices 408. Instead, computing device 140 may receive equivalent input information by receiving commands in the form of messages transmitted over a network and received via the network adapter 418. In one embodiment, switch 416 is configured to provide connections between I/O bridge 407 and other components of the computing device 140, such as a network adapter 418 and various add-in cards 420 and 421.

In one embodiment, I/O bridge 407 is coupled to a system disk 414 that may be configured to store content and applications and data for use by processor 142 and parallel processing subsystem 412. In one embodiment, system disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 407 as well.

In various embodiments, memory bridge 405 may be a Northbridge chip, and I/O bridge 407 may be a Southbridge chip. In addition, communication paths 406 and 413, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 412 comprises a graphics subsystem that delivers pixels to an optional display device 410 that may be any conventional cathode ray tube, liquid crystal display, light-emitting diode display, or the like. In such embodiments, the parallel processing subsystem 412 incorporates circuitry optimized for graphics and video processing, including, for example, video output circuitry. Such circuitry may be incorporated across one or more parallel processing units (PPUs), also referred to herein as parallel processors, included within parallel processing subsystem 412. In other embodiments, the parallel processing subsystem 412 incorporates circuitry optimized for general purpose and/or compute processing. Again, such circuitry may be incorporated across one or more PPUs included within parallel processing subsystem 412 that are configured to perform such general purpose and/or compute operations. In yet other embodiments, the one or more PPUs included within parallel processing subsystem 412 may be configured to perform graphics processing, general purpose processing, and compute processing operations. System memory 144 includes at least one device driver configured to manage the processing operations of the one or more PPUs within parallel processing subsystem 412. In addition, the system memory 144 stores the display application 146, the model trainer 160, and the optimization application 170. Although described herein primarily with respect to the display application 146, the model trainer 160, and the optimization application 170, techniques disclosed herein can also be implemented, either entirely or in part, in other software and/or hardware, such as in the parallel processing subsystem 412.

In various embodiments, parallel processing subsystem 412 may be integrated with one or more of the other elements of FIG. 4 to form a single system. For example, parallel processing subsystem 412 may be integrated with processor 142 and other connection circuitry on a single chip to form a system on chip (SoC).

In one embodiment, processor 142 is the master processor of computing device 140, controlling and coordinating operations of other system components. In one embodiment, processor 142 issues commands that control the operation of PPUs. In some embodiments, communication path 413 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 402, and the number of parallel processing subsystems 412, may be modified as desired. For example, in some embodiments, system memory 144 could be connected to processor 142 directly rather than through memory bridge 405, and other devices would communicate with system memory 144 via memory bridge 405 and processor 142. In other embodiments, parallel processing subsystem 412 may be connected to I/O bridge 407 or directly to processor 142, rather than to memory bridge 405. In still other embodiments, I/O bridge 407 and memory bridge 405 may be integrated into a single chip instead of existing as one or more discrete devices. In certain embodiments, one or more components shown in FIG. 4 may not be present. For example, switch 416 could be eliminated, and network adapter 418 and add-in cards 420, 421 would connect directly to I/O bridge 407. Lastly, in certain embodiments, one or more components shown in FIG. 4 may be implemented as virtualized resources in a virtual computing environment, such as a cloud computing environment. In particular, the parallel processing subsystem 412 may be implemented as a virtualized parallel processing subsystem in some embodiments. For example, the parallel processing subsystem 412 could be implemented as a virtual graphics processing unit (GPU) that renders graphics on a virtual machine (VM) executing on a server machine whose GPU and other physical resources are shared across multiple VMs.

Displaying Content Via Holographic Volumetric Displays

Figure 5:
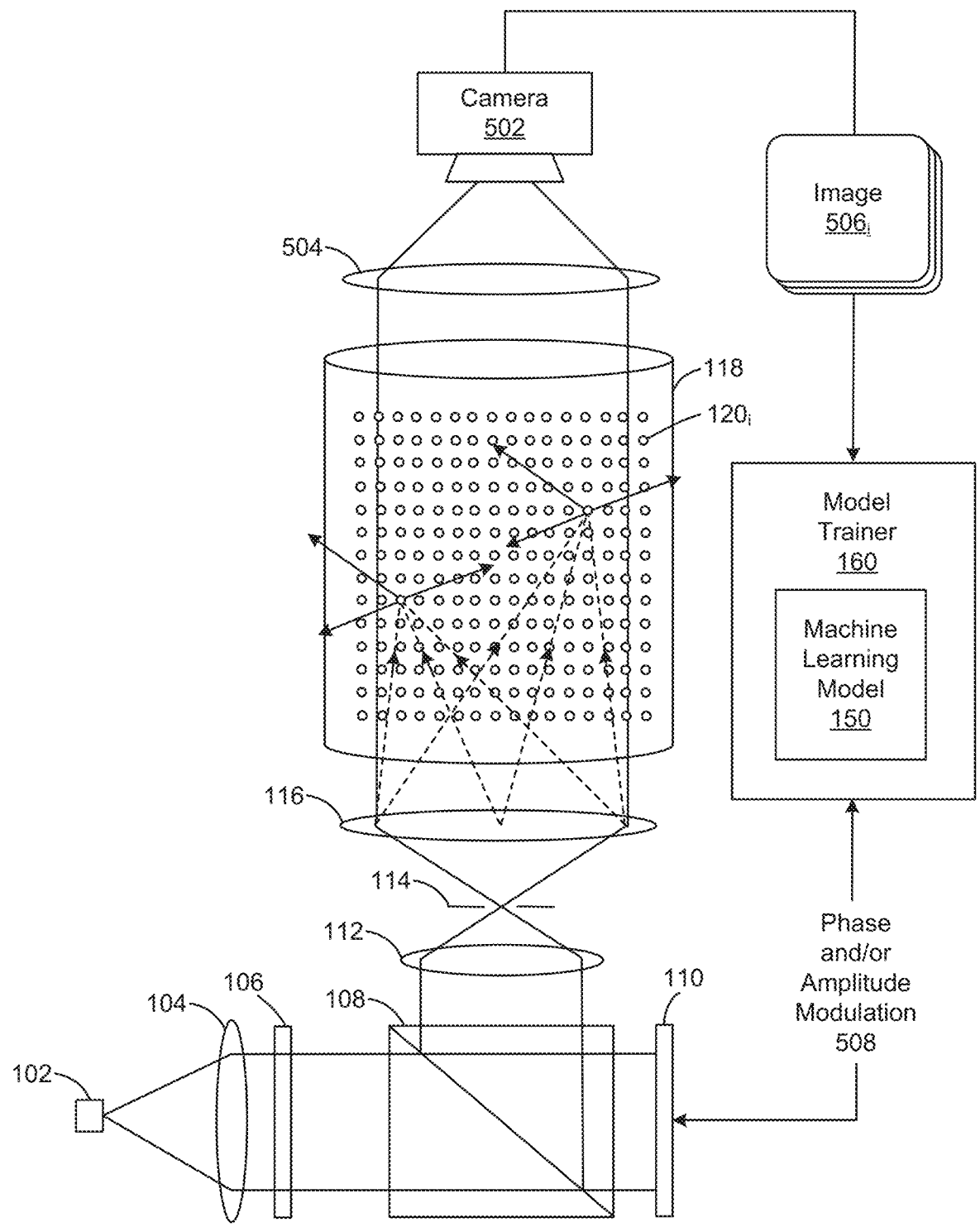
FIG. 5 illustrates how a machine learning model can be trained via camera-in-the-loop training, according to various embodiments.

FIG. 5 illustrates how the machine learning model 150 can be trained via camera-in-the-loop training, according to various embodiments. Once trained, the machine learning model 150 can be used to display 2D or 3D content via the holographic volumetric display system 100. Although described with respect to the machine learning model 150 as a reference example, the machine learning model 350, described above in conjunction with FIG. 3, can be trained in a similar manner in some embodiments.

As shown, camera-in-the loop training of the machine learning model 150 requires a camera 502 and a lens 504 that focuses light towards the camera 502. In some embodiments, camera-in-the loop training of the machine learning model 150 can be performed during a calibration phase. The camera 502 and the lens 504 are not required, and can be removed from the holographic volumetric display system, after the machine learning model 150 is trained during the calibration phase.

During camera-in-the loop training, the machine learning model 150 learns to approximate a light propagation function that defines how light from each pixel of the SLM 110 is propagated to a number of target planes within the container 118. In some embodiments, each target plane is at a different depth relative to the camera 502 and is associated with a number of scatterers 120 at such a depth. In some embodiments, the machine learning model 150 is an artificial neural network that takes as input the phase and/or amplitude modulation applied by the SLM 110 and outputs predicted light intensities at the target planes within the container 118.

In some embodiments, during camera-in-the-loop training, the model trainer 160 (or another application) causes phase and/or amplitude modulation 508 to be applied by the SLM 110. For example, in some embodiments, random phase and/or amplitude modulations can be applied. Each time after a different phase and/or amplitude modulation is applied, a focal length of the camera 502 is varied, and images are captured of different target planes within the container 118 corresponding to different focal lengths. Although described herein primarily with respect to capturing multiple images using different focal lengths of a camera as a reference example, in some embodiments, a light field camera can be used to capture information from multiple depths in a single image. The captured images of different target planes within the container 118 (or captured light field image) essentially provide a captured light intensity distribution over the volume of the container 118 caused by the phase and/or amplitude modulation that is applied. Accordingly, the model trainer 160 (or another application) can generate training data that includes multiple pairs of (1) phase and/or amplitude modulation, and (2) images (shown as images 5061 (referred to herein collectively as "images 506" and individually as "an image 506") of different target planes (or a light field image) subsequent to application of the phase and/or amplitude modulation. The pairs of (1) phase and/or amplitude modulation, and (2) corresponding images at different target planes (or light field image) are provided as the input and expected output, respectively, of the machine learning model 150 during camera-in-the-loop training. In some embodiments, the machine learning model 150 can have any suitable architecture and be trained in any technically feasible manner. For example, in some embodiments, the machine learning model 150 can be an artificial neural network whose parameters are updated during training using backpropagation with gradient descent and the training data, described above.

Subsequent to camera-in-the loop training, in order to display particular 2D or 3D content, the display application 146 (or another application) can use the trained machine learning 150 model to determine the phase and/or amplitude modulation required to display the particular 2D or 3D content. Then, the display application 146 (or another application) controls the SLM 110 to apply the determined phase and/or amplitude modulation, thereby causing the particular 2D or 3D content to be displayed as a 2D or 3D image within the container 118 of the holographic volumetric display system 100.

Figure 6:
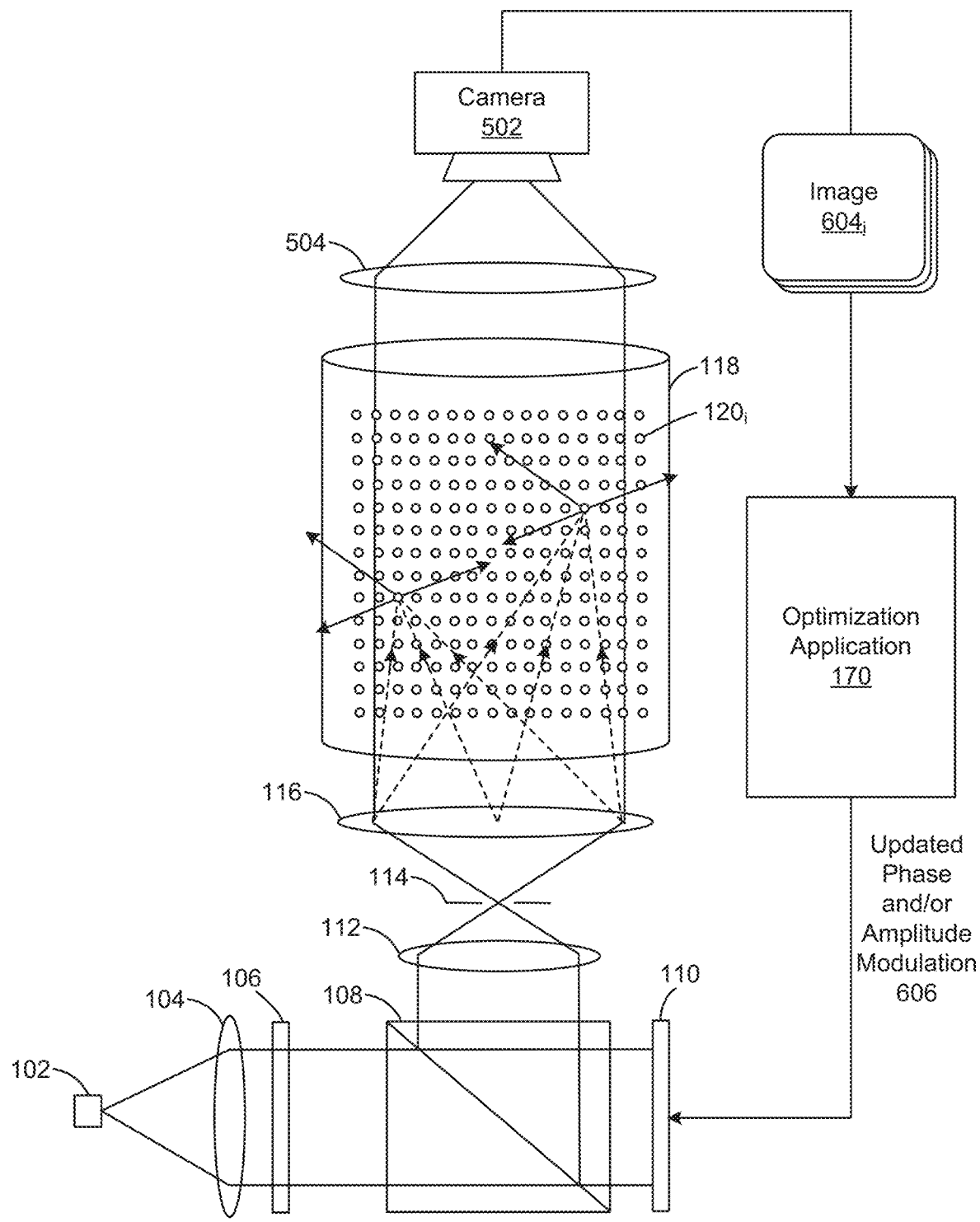
FIG. 6 illustrates how phase and/or amplitude modulation for displaying two-dimensional (2D) or three-dimensional (3D) content can be determined via camera-in-the-loop optimization, according to various embodiments.

FIG. 6 illustrates how phase and/or amplitude modulation for displaying 2D or 3D content can be determined via camera-in-the-loop optimization, according to various embodiments. Once determined, the phase and/or amplitude modulation can be used to display the 2D or 3D content via the holographic volumetric display system 100. It should be understood that camera-in-the-loop optimization essentially "overfits" the phase and/or amplitude modulation to the 2D or 3D content to be displayed, and camera-in-the-loop optimization is generally faster than camera-in-the-loop training, described above in conjunction with FIG. 5. Although described with respect to the optimization application 170 as a reference example, a similar camera-in-the-loop optimization can be performed by the optimization application 370, described above in conjunction with FIG. 3, in some embodiments.

As shown, camera-in-the-loop optimization also requires the camera 502 and the lens 504 that focuses light towards the camera 502. In some embodiments, camera-in-the-loop optimization can be performed during a calibration phase. The camera 502 and the lens 504 are not required, and can be removed from the holographic volumetric display system, after the camera-in-the-loop optimization is performed during the calibration phase.

During each iteration of camera-in-the-loop optimization, the optimization application 170 causes phase and/or amplitude modulation to be applied by the SLM 110. After the phase and/or amplitude modulation 606 is applied, a focal length of the camera 502 is varied to capture images 604$_i$ (referred to herein collectively as "images 604" and individually as "an image 604") of different target planes within the container 118, similar to the description above in conjunction with FIG. 5. Although described herein primarily with respect to capturing multiple images 604 using different focal lengths of a camera as a reference example, in some embodiments, a light field camera can be used to capture information from multiple depths in a single image. The optimization application 170 then computes a loss that is the difference between the captured images 604 (or captured light field image) and target images (or target light field image) corresponding to particular 2D or 3D content to be displayed. Thereafter, the optimization application 170 determines an updated phase and/or amplitude modulation 606, and causes the SLM 110 to apply the updated phase and/or amplitude modulation 606. For example, in some embodiments, the optimization application 170 can compute an L2 loss between the images 604 (or light field image) and the target images (or target light field image) corresponding to particular 2D or 3D content to be displayed, and the optimization application 170 can backpropagate the calculated loss via a stochastic gradient descent technique to update the phase and/or amplitude modulation. In addition, the foregoing process can be repeated until, for example, the loss is less than a threshold. Although described herein primarily with respect to camera-in-the-loop optimization that does not involve a machine learning model, in some embodiments, camera-in-the-loop optimization can utilize a trained machine learning model to determine how light propagates from the SLM 110 to target planes, described above in conjunction with FIG. 5.

Subsequent to camera-in-the loop optimization, in order to display particular 2D or 3D content, the display application 146 (or another application) can control the SLM 110 to apply the phase and/or amplitude modulation that was determined via the camera-in-the-loop optimization for the particular 2D or 3D content, thereby causing the particular 2D or 3D content to be displayed as a 2D or 3D image within the container 118 of the holographic volumetric display system 100.

Figure 7A:
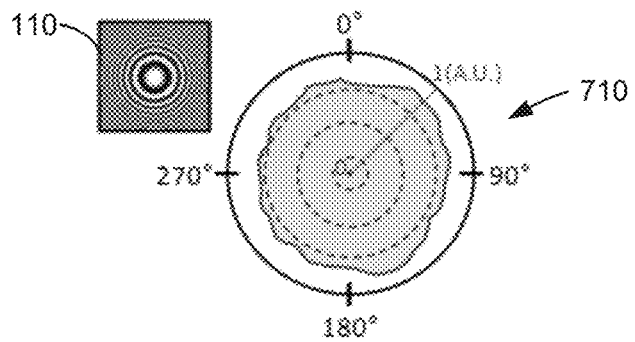
FIGS. 7A-7D illustrate how a spatial light modulator can be masked to control the directions in which light is scattered by scatterers, according to various embodiments.

FIGS. 7A-7D illustrate how a SLM can be masked to control the directions in which light is scattered by scatterers, according to various embodiments. In some embodiments, the directions in which light scatters can be controlled to display 2D or 3D content that includes occlusions. As shown in FIG. 7A, when the entire SLM 110 is used to modulate the phase and/or amplitude of light in the holographic volumetric display system 100, the scattering profile 710 of each scatterer (e.g., one of scatters 120) is substantially uniform in all directions, i.e., in 360 degrees.

Figure 7B:
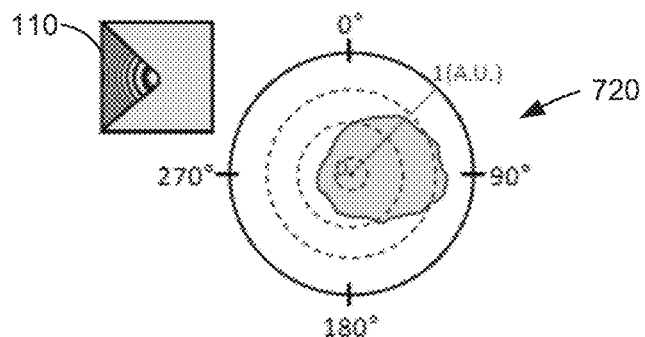
Figure 7C:
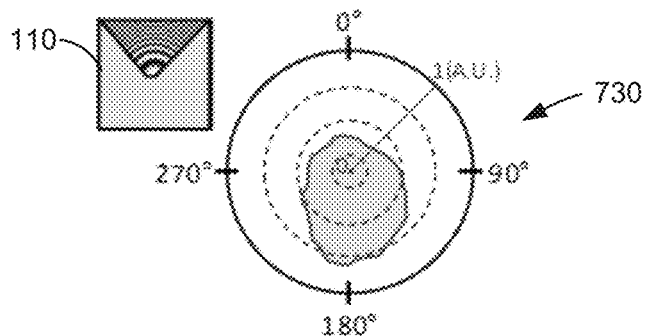
Figure 7D:
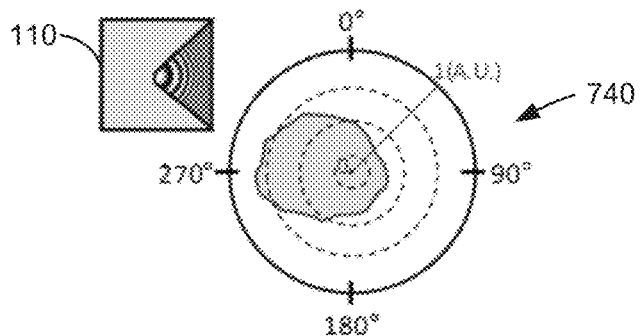

As shown in FIGS. 7B-7D, when only a partial region of the SLM 110 is used to modulate the phase and/or amplitude of light in the holographic volumetric display system 100, the scattering profiles 720, 730, and 740 of each scatterer (e.g., one of scatters 120) is directional. In some embodiments, the correspondence between SLM regions and scattering directions can be determined during a calibration phase. Subsequent to calibration, the 2D or 3D display application can use the correspondences between SLM regions and scattering directions during phase and/or amplitude optimization, described above in conjunction with FIG. 5, to determine the phase and/or amplitude modulation to apply for displaying particular 2D or 3D content with occlusions. Thereafter, the display application 146 can control the SLM 110 to apply the determined phase and/or amplitude modulation, thereby causing the particular 2D or 3D content with occlusions to be displayed as a 2D or 3D image within the container 118 of the holographic volumetric display system 100. That is, the correspondence "SLM region—output light direction" is determined during calibration, after which the output light direction can be controlled using a partial region of the SLM 110. For example, only the right half of the SLM 110 could be used to light up a voxel so that the voxel emits light mostly to the left.

Although 7A-7D are described with respect to the SLM 110 as a reference example, the SLM 306, described above in conjunction with FIG. 3, can be masked in a similar manner to control the directions in which light is scattered by scatterers 320 of the holographic volumetric display system 300 in some embodiments.

Figure 8:
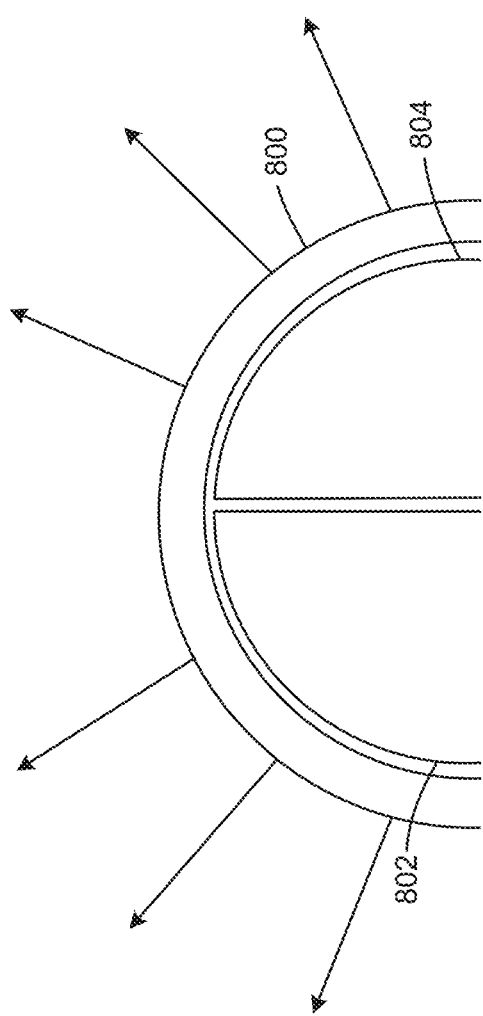
FIG. 8 illustrates how hemispherical scatterers can be used to control the directions in which light scatters, according to various embodiments.

FIG. 8 illustrates how hemispherical scatterers can be used to control the directions in which light scatters, according to various embodiments. As shown, a hemispherical scatterer 800, which can correspond to one of the scatters 120 or 320 described above in conjunction with FIGS. 1-3, is larger than the resolution of a holographic volumetric display system because the hemispherical scatterer 800 is used to scatter light associated with two pixels 802 and 804. The hemispherical scatterer 800 can be constructed from any suitable material(s) and in any technically feasible manner. For example, in some embodiments, the hemispherical scatterer 800 can be constructed as a micro lens with diffusers on top of the micro lens.

Given the hemispherical scatterer 800, the direction of scattering can be controlled by controlling an SLM (e.g., SLM 110 or 310) to modulate the phase and/or amplitude of light such that the modulated light is incident on only a portion of the hemispherical scatterer 800 corresponding to either the pixel 802 or the pixel 804. In addition, the SLM can be controlled to modulate the phase and/or amplitude of light such that the modulated light is incident on the entire hemispherical scatterer 800, thereby producing uniform scattering. Accordingly, the hemispherical scatterers can act as locally varying micro-scatterers that, along with holographic pixel localization, can be used to control the directions in which light scatters in order to display occlusions.

Although described with respect to an illustrative hemispherical scatterer 800 as a reference example, in some examples, micro mirrors, micro lenses, micro cylinder-shaped scatterers, non-linear scatterers, or any other micro-scale scatterer can be used to reproduce directional output in a similar manner as the hemispherical scatterer 800. Although SLM masking and hemispherical scatterers are described separately with respect to FIGS. 7A-D and 8, in some embodiments, a holographic volumetric display system can utilize both SLM masking and hemispherical scatterers (or other micro-scale scatterers) to control the direction in which light scatters.

Figure 9:
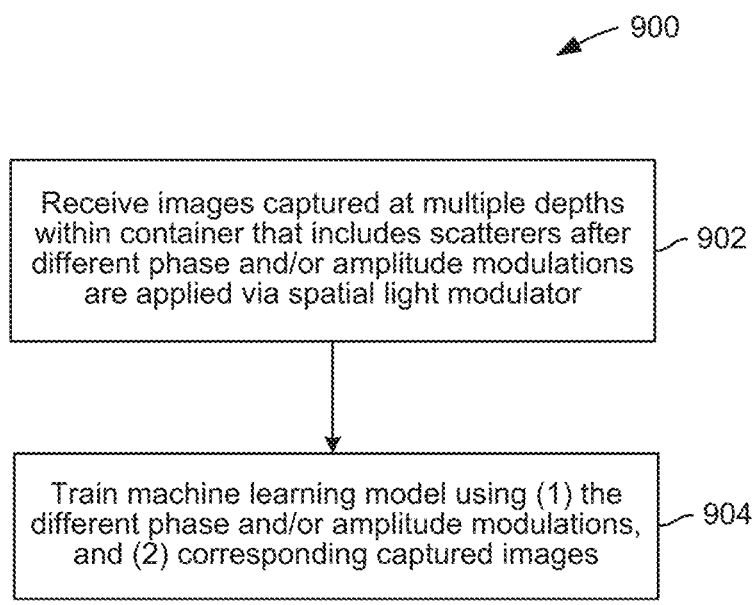
FIG. 9 illustrates a flow diagram of method steps for performing camera-in-the-loop training of a machine learning model to approximate a light propagation function, according to various embodiments.

FIG. 9 illustrates a flow diagram of method steps for performing camera-in-the-loop training of a machine learning model to approximate a light propagation function, according to various embodiments. Although the method steps are described in conjunction with the systems of FIGS. 1-4, persons skilled in the art will understand that any system configured to perform the method steps in any order falls within the scope of the present embodiments.

As shown, a method 900 begins at step 902, where a model trainer (e.g., model trainer 160 or 360) receives images captured at multiple depths within a container (e.g., container 118 or 318) that includes scatterers after different phase and/or amplitude modulations are applied via a SLM (e.g., SLM 110 or 306) that modulates light, which is then scattered by the scatterers. In some embodiments, different random phase and/or amplitude modulations can be applied. In some embodiments, the focal length of a camera (e.g., camera 502) is varied, and images are captured of target planes at multiple depths within the container after the different phase and/or amplitude modulations are applied. In some other embodiments, a light field camera can be used to capture information from multiple depths in a single image for each different phase and/or amplitude modulation that is applied.

At step 904, the model trainer trains a machine learning model (e.g., machine learning model 150 or 350) using (1) the phase and/or amplitude modulation, and (2) the captured images at multiple depths (or captured light field images). As described, in some embodiments, pairs of (1) a phase and/or amplitude modulation, and (2) corresponding captured images at depths (or a light field image) can be provided as the input and the expected output, respectively, of the machine learning model during the training, which can include performing, e.g., backpropagation with gradient descent or any other technically feasible training technique to update parameters of the machine learning model.

Figure 10:
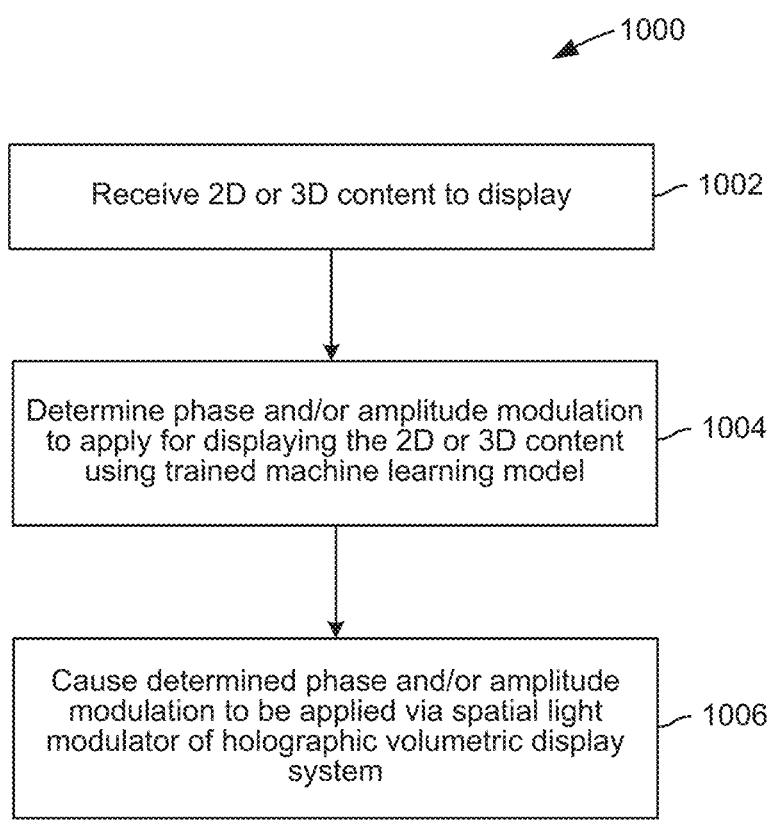
FIG. 10 illustrates a flow diagram of method steps for displaying 2D or 3D content on a holographic volume display using a trained machine learning model that approximates a light propagation function, according to various embodiments.

FIG. 10 illustrates a flow diagram of method steps for displaying 2D or 3D content on a holographic volume display using a trained machine learning model that approximates a light propagation function, according to various embodiments. Although the method steps are described in conjunction with the systems of FIGS. 1-4, persons skilled in the art will understand that any system configured to perform the method steps in any order falls within the scope of the present embodiments.

As shown, a method 1000 begins at step 1002, where a display application (e.g., display application 146 or display application 346) receives 2D or 3D content to display. For example, the 2D or 3D content could be a standalone 2D or 3D image or a 2D or 3D frame of a video.

At step 1004, the display application determines a phase and/or amplitude modulation to apply for displaying the 2D or 3D content using a trained machine learning model (e.g., machine learning model 150 or 350). In some embodiments, the machine learning model is trained according to the method 900, described above in conjunction with FIG. 9. As described, the trained machine learning model can approximate a light propagation function that defines how light from each pixel of an SLM is propagated to a number of target planes within a container that includes a number of scatterers.

At step 1006, the display application causes the determined phase and/or amplitude modulation to be applied via a SLM of a holographic volumetric display system (e.g., holographic volumetric display system 100 or 300).

Figure 11:
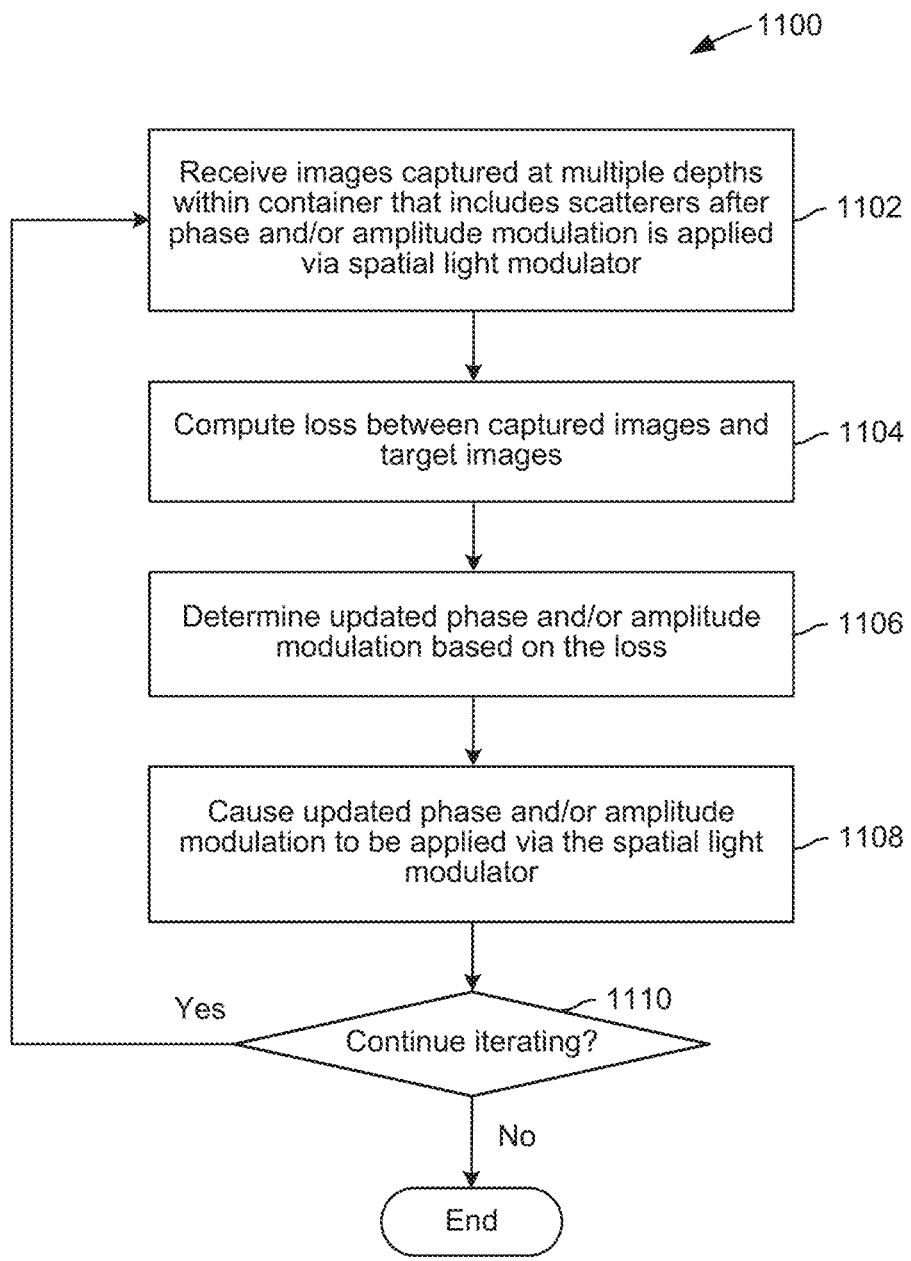
FIG. 11 illustrates a flow diagram of method steps for performing camera-in-the-loop optimization of the phase and/or amplitude modulation used to display 2D or 3D content, according to various embodiments.

FIG. 11 illustrates a flow diagram of method steps for performing camera-in-the-loop optimization of the phase and/or amplitude modulation used to display 2D or 3D content, according to various embodiments. Although the method steps are described in conjunction with the systems of FIGS. 1-4, persons skilled in the art will understand that any system configured to perform the method steps in any order falls within the scope of the present embodiments.

As shown, a method 1100 begins at step 1102, where an optimization application (e.g., optimization application 170) receive images captured at multiple depths within a container (e.g., container 118 or 318) that includes scatterers after phase and/or amplitude modulation is applied via an SLM (e.g., SLM 110 or 306) that modulates light, which is then scattered by the scatterers. In some embodiments, the focal length of a camera (e.g., camera 502) is varied to capture images of target planes at the multiple depths within the container. In some other embodiments, a light field camera can be used to capture information from multiple depths in a single image for each different phase and/or amplitude modulation that is applied.

At step 1104, the optimization application computes a loss between the captured images (or light field image) and target images (or a target light field image) associated with 2D or 3D content to be displayed. In some embodiments, the loss can be an L2 loss.

At step 1106, the optimization application determines an updated phase and/or amplitude modulation based on the loss computed at step 1104. In some embodiments, the optimization application 170 can backpropagate the calculated loss via, e.g., a stochastic gradient descent technique, to update the phase and/or amplitude modulation.

At step 1108, the optimization application 170 causes the updated phase and/or amplitude modulation to be applied via the spatial light modulator.

At step 1110, if the optimization application determines to continue iterating, such as if the loss computed at step 1104 is greater than a threshold, then the method 1100 returns to step 1102, where the optimization application receives additional images captured at multiple depths within a container that includes scatterers after the updated phase and/or amplitude modulation is applied via the spatial light modulator that modulates light that is then scattered by the scatterers. On the other hand, if the optimization application determines to stop iterating, then the method 1100 ends. Subsequent to the camera-in-the-loop optimization, the determined phase and/or amplitude modulation can be applied via a SLM of a holographic volumetric display system (e.g., holographic volumetric display system 100 or 300) to display the particular 2D or 3D content for which the camera-in-the-loop optimization was performed.

In sum, techniques are disclosed for displaying 2D or 3D content using a holographic volumetric display system. In some embodiments, the holographic volumetric display system includes a light source that emits light, one or more SLMs that modulate a phase and/or an amplitude of the light, and multiple scatterers that scatter the light after the phase and/or amplitude modulation has been applied. The scatterers can be disposed within a container of any suitable shape and size, such as a cylindrical container. In some embodiments, a machine learning model is trained, via a camera-in-the-loop training technique, to approximate a light propagation function that defines how light from each pixel of the SLM is propagated to a number of target planes within the container. Phase and/or amplitude optimization can then be performed using the trained machine learning model to determine the phase and/or amplitude modulation that is required to display particular 2D or 3D content. In some other embodiments, the phase and/or an amplitude modulation required to display particular 2D or 3D content is directly calculated via a camera-in-the-loop optimization technique.

At least one technical advantage of the disclosed techniques and designs relative to the prior art is that the disclosed techniques and designs enable holographic volumetric displays that display 2D or 3D content, including 2D or 3D content that includes occlusions, to multiple users with vertical as well as horizontal parallax effects. Further, the disclosed techniques and designs enable holographic volumetric displays to display 2D or 3D content that has relatively high image quality and can be viewed from any direction. Accordingly, with the disclosed techniques and designs, users are not required to sit upright and directly in front of the disclosed holographic volumetric displays to perceive 3D effects. In addition, the disclosed holographic volumetric displays do not include rotating components that are noisy or potentially dangerous to users. These technical advantages represent one or more technological improvements over prior art approaches.

1. In some embodiments, a display system comprises one or more light sources, one or more spatial light modulators, and a plurality of scatterers.

2. The display system of clause 1, wherein the plurality of scatterers are disposed within a container.

3. The display system of clauses 1 or 2, wherein the plurality of scatterers are disposed along a plurality of planes within the container.

4. The display system of any of clauses 1-3, wherein the container is cylindrical.

5. The display system of any of clauses 1-4, wherein the container is configurable to at least one of extend from or retract within a table.

6. The display system of any of clauses 1-5, wherein each scatterer included in the plurality of scatterers is associated with one or more volumetric pixels.

7. The display system of any of clauses 1-6, further comprising a waveguide configured to guide light emitted by the one or more light sources towards the plurality of scatterers.

8. The display system of any of clauses 1-7, further comprising at least one of a lens, a polarizer, or a beam splitter disposed in a light path between the one or more light sources and the plurality of scatterers.

9. The display system of any of clauses 1-8, further comprising one or more memories storing instructions, and one or more processors that are coupled to the one or more memories and, when executing the instructions, are configured to compute at least one of a phase or an amplitude modulation associated with three-dimensional (3D) content or two-dimensional (2D) content, and cause the one or more spatial light modulators to modulate light emitted by the one or more light sources based on the at least one of a phase or an amplitude modulation.

10. The display system of any of clauses 1-9, wherein the at least one of a phase or an amplitude modulation is computed based on the 2D or 3D content and a trained machine learning model.

11. In some embodiments, a computer-implemented method for displaying content comprises computing at least one of a phase or an amplitude modulation associated with two-dimensional (2D) or three-dimensional (3D) content, and causing one or more spatial light modulators to modulate light based on the at least one of a phase or an amplitude modulation to generate modulated light, wherein the modulated light is scattered by a plurality of scatterers.

12. The computer-implemented method of clause 11, wherein the at least one of a phase or an amplitude modulation is computed based on the 2D or 3D content and a trained machine learning model.

13. The computer-implemented method of clauses 11 or 12, further comprising performing one or more operations to train a machine learning model based on light that is scattered by the plurality of scatterers and captured by one or more cameras.

14. The computer-implemented method of any of clauses 11-13, wherein the plurality of scatterers are disposed within a container, and the method further comprises performing one or more operations to train a machine learning model based on one or more images that capture information at different depths within the container.

15. The computer-implemented method of any of clauses 11-14, wherein computing the at least one of a phase or an amplitude modulation comprises performing at least one of one or more phase optimization operations or one or more amplitude optimization operations based on a trained machine learning model.

16. The computer-implemented method of any of clauses 11-15, wherein computing the at least one of a phase or an amplitude modulation comprises performing one or more machine learning operations.

17. The computer-implemented method of any of clauses 11-16, wherein computing the at least one of a phase or an amplitude modulation comprises performing one or more camera-in-the-loop optimization operations.

18. The computer-implemented method of any of clauses 11-17, wherein the least one of a phase or an amplitude modulation is associated with a portion of each spatial light modulator included in the one or more spatial light modulators.

19. The computer-implemented method of any of clauses 11-18, further comprising causing a container in which the plurality of scatterers are disposed to at least one of extend from or extract within a table.

20. In some embodiments, one or more non-transitory computer-readable media storing instructions that, when executed by at least one processor, cause the at least one processor to perform the steps of computing at least one of a phase or an amplitude modulation associated with two-dimensional (2D) or three-dimensional (3D) content, and causing one or more spatial light modulators to modulate light based on the at least one of a phase or an amplitude modulation to generate modulated light, wherein the modulated light is scattered by a plurality of scatterers.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A display system comprising:
one or more light sources;
one or more spatial light modulators that modulate light emitted by the one or more light sources in accordance with at least one of a phase or an amplitude modulation to generate modulated light, wherein the at least one of a phase or an amplitude modulation is computed based on two-dimensional (2D) or three-dimensional (3D) content to be displayed; and
a plurality of scatterers, wherein the one or more spatial light modulators direct the modulated light towards a subset of scatterers included in the plurality of scatterers, and wherein the modulated light is scattered by the subset of scatterers to display the 2D or 3D content.

2. The display system of claim 1, wherein the plurality of scatterers are disposed within a container.

3. The display system of claim 2, wherein the plurality of scatterers are disposed along a plurality of planes within the container.

4. The display system of claim 2, wherein the container is cylindrical.

5. The display system of claim 2, wherein the container is configurable to at least one of extend from or retract within a table.

6. The display system of claim 1, wherein each scatterer included in the plurality of scatterers is associated with one or more volumetric pixels.

7. The display system of claim 1, further comprising a waveguide configured to guide light emitted by the one or more light sources towards the plurality of scatterers.

8. The display system of claim 1, further comprising at least one of a lens, a polarizer, or a beam splitter disposed in a light path between the one or more light sources and the plurality of scatterers.

9. The display system of claim 1, further comprising:
one or more memories storing instructions; and
one or more processors that are coupled to the one or more memories and, when executing the instructions, are configured to:
compute the at least one of a phase or an amplitude modulation based on the three-dimensional (3D) content or two-dimensional (2D) content to be displayed, and
cause the one or more spatial light modulators to modulate light emitted by the one or more light sources in accordance with the at least one of a phase or an amplitude modulation.

10. The display system of claim 9, wherein the at least one of a phase or an amplitude modulation is computed via a trained machine learning model.

11. A computer-implemented method for displaying content, the method comprising:
computing at least one of a phase or an amplitude modulation based on two-dimensional (2D) or three-dimensional (3D) content to be displayed; and
causing one or more spatial light modulators to modulate light in accordance with the at least one of a phase or an amplitude modulation to generate modulated light that is directed towards a subset of scatterers included in a plurality of scatterers, wherein the modulated light is scattered by the subset of scatterers to display the 2D or 3D content.

12. The computer-implemented method of claim 11, wherein the at least one of a phase or an amplitude modulation is computed via a trained machine learning model.

13. The computer-implemented method of claim 12, further comprising performing one or more operations to train a machine learning model based on light that is scattered by the plurality of scatterers and captured by one or more cameras.

14. The computer-implemented method of claim 12, wherein the plurality of scatterers are disposed within a container, and the method further comprises performing one or more operations to train a machine learning model based on one or more images that capture information at different depths within the container.

15. The computer-implemented method of claim 11, wherein computing the at least one of a phase or an amplitude modulation comprises performing at least one of one or more phase optimization operations or one or more amplitude optimization operations based on a trained machine learning model.

16. The computer-implemented method of claim 11, wherein computing the at least one of a phase or an amplitude modulation comprises performing one or more machine learning operations.

17. The computer-implemented method of claim 11, wherein computing the at least one of a phase or an amplitude modulation comprises performing one or more camera-in-the-loop optimization operations.

18. The computer-implemented method of claim 11, wherein the least one of a phase or an amplitude modulation is associated with a portion of each spatial light modulator included in the one or more spatial light modulators.

19. The computer-implemented method of claim 11, further comprising causing a container in which the plurality of scatterers are disposed to at least one of extend from or extract within a table.

20. One or more non-transitory computer-readable media storing instructions that, when executed by at least one processor, cause the at least one processor to perform the steps of:
computing at least one of a phase or an amplitude modulation based on two-dimensional (2D) or three-dimensional (3D) content to be displayed; and
causing one or more spatial light modulators to modulate light in accordance with the at least one of a phase or an amplitude modulation to generate modulated light that is directed towards a subset of scatterers included in a plurality of scatterers, wherein the modulated light is scattered by the subset of scatterers to display the 2D or 3D content.

\* \* \* \* \*